United States Patent [19]

McCarthy et al.

[11] 4,299,749

[45] Nov. 10, 1981

[54] FLOOR COATING COMPOSITION

[75] Inventors: Francis L. McCarthy, Pompton Plains, N.J.; Thomas H. Bach, Pearl River, N.Y.

[73] Assignee: Sterling Drug Inc., New York, N.Y.

[21] Appl. No.: 197,546

[22] Filed: Oct. 16, 1980

Related U.S. Application Data

[63] Continuation-in-part of Ser. No. 163,986, Jun. 30, 1980, abandoned.

[51] Int. Cl.³ .............................................. C08L 33/02
[52] U.S. Cl. ........................... 260/29.6 Z; 260/29.6 E
[58] Field of Search ................... 260/28.5 R, 29.6 Z, 260/29.6 E

[56] References Cited

U.S. PATENT DOCUMENTS

| | | | |
|---|---|---|---|
| 3,065,123 | 11/1962 | Hinton | 424/270 |
| 3,793,275 | 2/1974 | Corey | 260/28.5 R |
| 4,013,607 | 3/1977 | Dwyer | 260/29.6 H |
| 4,017,662 | 4/1977 | Gehman | 260/28.5 R |
| 4,070,510 | 1/1978 | Kahn | 260/28.5 R |

*Primary Examiner*—Paul R. Michl
*Attorney, Agent, or Firm*—Frederik W. Stonner; B. Woodrow Wyatt

[57] ABSTRACT

The invention relates to a stable aqueous self-stripping floor cleaning, coating and polishing composition containing a low molecular weight alkali-soluble acrylic type addition-polymer, a fugitive plasticizer, tributoxyethyl phosphate, tetrasodium ethylenediaminetetraacetate, an anionic or nonionic fluorocarbon surfactant, a dimethylpolysiloxane antifoaming agent, 1,2-benzothiazolin-3-one, an alkali metal bicarbonate, water and ammonia to pH 9 to 9.7; and optionally formaldehyde, caprolactam and a styrene-maleic anhydride copolymer, the composition having a solids content of from 5 to 15% by weight.

17 Claims, No Drawings

FLOOR COATING COMPOSITION

CROSS-REFERENCE TO RELATED APPLICATION

This application is a continuation-in-part of copending application Ser. No. 163,986, filed June 30, 1980, now abandoned.

BACKGROUND OF THE INVENTION

1. Field of the Invention

The invention relates to aqueous floor cleaning, coating and polishing compositions.

2. The Prior Art

Aqueous floor coating and polishing compositions containing alkali-soluble polymers as coating agents are described in the art. Certain prior art compositions are not self-stripping, i.e., repeated use thereof on a floor results in a building up of successive layers of the coating agent which periodically must be removed with a specially formulated alkaline stripping composition. For example, a prior art composition which is not self-stripping has the following composition:

| Component | % by weight |
|---|---|
| 1. Water | 50.7196 |
| 2. Formalin (37%) | 0.2270 |
| 3. Proxel CRL[a] | 0.0500 |
| 4. FD-82[b] | 0.0030 |
| 5. Addition Polymer Emulision (approx. 37%)[c] | 39.0640 |
| 6. Sodium Bicarbonate | 0.5080 |
| 7. Tributoxyethyl Phosphate | 1.6822 |
| 8. Caprolactam | 0.1849 |
| 9. Methyl Carbitol | 3.2235 |
| 10. Fragrance | 0.1469 |
| 11. SMA 17352 resin solution (19.4%)[d] | 2.9241 |
| 12. FC-128[e] | 0.0203 |
| 13. Ammonium Hydroxide (28%) | 1.2440 |
| 14. Dye solution (1% in carbitol) | 0.0025 | pH = 8.0
Solids = 17.0–17.2%
[a]Liquid preservative from ICI America Inc.; aqueous solution of 1,2-benzothiazoline-3-one (27%) and ethylenediamine (27%).
[b]Antifoaming agent from HODAG; 30% active oil in water emulsion of a dimethylpolysiloxane containing a nonionic emulsifier and having a viscosity of 4000 cps at 25° C.
[c]A low molecular weight water-insoluble addition polymer obtained by emulsion polymerization falling within the scope of the addition polymers described hereinbelow.
[d]SMA 17352 resin from ARCO Chemical Company; a 19.4% active solution in soft water containing 4.3% ammonium hydroxide solution (28%).
[e]Fluorocarbon surfactant from 3M Company; potassium N-ethyl-N-[(heptadecafluorooctyl)sulfonyl]glycinate.

Other prior art compositions are described which are self-stripping, i.e., they are adapted to dissolve or disperse a previously deposited coating agent and replace it with a fresh film of the coating agent thus avoiding or reducing buildup of the coating agent on repeated use. Thus, U.S. Pat. No. 4,013,607 describes self-stripping aqueous coating compositions containing as the primary polymeric coating agent an alkali soluble resin of low molecular weight and high acid number and having a pH no less than 9.

U.S. Pat. No. 4,017,662 describes aqueous coating compositions having a pH of at least 7 and as high as 10 and containing as the primary coating agent an alkali-soluble low-molecular weight acrylic-type addition polymer.

U.S. Pat. No. 3,793,275 describes aqueous hard surface cleaning and/or polishing compositions containing an acrylic-based water insoluble film former and having a pH in the range of 7.5 to 9.5.

OBJECTS AND SUMMARY OF THE INVENTION

It is an object of the invention to provide an aqueous floor coating and polishing composition which is self-stripping.

It is an additional object of the invention to provide an aqueous floor coating and polishing composition which is adapted to simultaneously clean as well as to coat and polish flooring.

It is another object of the invention to provide an aqueous coating and polishing composition which on application to flooring and subsequent drying results in a thin layer of protective glossy coating which is readily solubilized and/or dispersed and replaced with a new thin layer of protective glossy coating on subsequent application of the aqueous coating and polishing composition.

It is still another object of the invention to provide an aqueous floor coating and polishing composition which is essentially water clear.

It is yet another object of the invention to provide an aqueous floor coating and polishing composition which is storage stable.

It is a further object of the invention to provide an aqueous floor coating and polishing composition which on application to flooring and subsequent drying results in a thin layer of protective glossy coating which is essentially colorless and resistant to discoloration.

It is still a further object of the invention to provide a method of periodically cleaning a floor and polishing the floor with a thin layer of a clear, high gloss coating agent without substantial buildup of successive layers of the coating agent.

In the composition aspect of the invention there is provided a stable aqueous self-stripping cleaning, coating and polishing composition consisting essentially of:

(a) from about 4 to 13% by weight of a water-insoluble, alkali-soluble addition polymer comprising from about 12 to 25% by weight of the addition polymer of at least one hydrophilic monomer selected from the group consisting of acrylic acid and methacrylic acid interpolymerized with from about 88 to 75% by weight of the addition polymer of at least one hydrophobic monomer selected from the group consisting of alkyl acrylate and alkyl methacrylate, where alkyl has from 1 to 8 carbon atoms, said addition polymer having an intrinsic viscosity at 30° C. in tetrahydrofuran of between about 0.05 and 0.2 dl/g.;

(b) from about 1 to 3% by weight of a fugitive plasticizer selected from the group consisting of diglyme, the mono-alkyl ether of diethylene glycol, the mono-alkyl ether of dipropylene glycol, 2-butoxyethanol and 3-methoxybutanol-(1), where alkyl has from 1 to 5 carbon atoms;

(c) from about 0.7 to 1.5% by weight of tributoxyethyl phosphate;

(d) from about 0.05 to 1.5% by weight of tetrasodium ethylenediaminetetraacetate;

(e) from about 0.005 to 0.02% by weight of an anionic or nonionic fluorocarbon surfactant;

(f) from about 0.0001 to 0.003% by weight of a dimethylpolysiloxane antifoaming agent;

(g) from about 0.002 to 0.02% by weight of 1,2-benzoisothiazolin-3-one, said 1,2-benzothiazolin-3-one being in the form of a water-soluble salt;

(h) from about 0.05 to 0.3% by weight of an alkali-metal bicarbonate selected from the group consisting of sodium bicarbonate and potassium bicarbonate;

(i) from 0% to about 0.3% by weight of formaldehyde;

(j) from 0% to about 0.2% by weight of caprolactam;

(k) from 0% to about 5% of an alkali-soluble copolymer of styrene and maleic anhydride, said copolymer having a styrene-maleic anhydride ratio of from 1:1 to 3:1, a number average molecular weight of from 1600 to 1900 and an acid number of 220 to 480;

(l) from about 75 to 94% by weight of water; and (m) ammonia to provide a pH of 9 to 9.7; said composition having a solids content of from about 5 to 15% by weight.

In the method aspect of the invention there is provided a method of periodically cleaning a floor and polishing the floor with a thin layer of a clear high gloss coating without substantial buildup of the coating which comprises periodically mopping the floor with the stable aqueous self-stripping cleaning, coating and polishing composition described hereinabove and allowing the composition to dry on the floor.

DETAILED DESCRIPTION INCLUSIVE OF THE PREFERRED EMBODIMENTS

The composition of the invention can be employed for the maintenance of floors comprising a variety of substrates such as linoleum, vinyl tile, etc., including no-wax flooring materials. No-wax floors, although coated with a "permanent" protective glossy coating comprising, e.g., a urethane type coating, nonetheless eventually tend to take on a dull appearance after prolonged use, particularly in high traffic areas. Therefore, a need exists for a cleaning, coating and polishing composition which periodically can be applied to no-wax flooring in order to maintain the high gloss appearance thereof while avoiding undesirable buildup of successive layers of the polishing and coating agent. The instant composition is particularly adapted for maintenance of no-wax flooring.

The primary polishing and coating agent in the composition of the invention is a low molecular weight water-insoluble, alkali-soluble addition polymer obtained by emulsion or solution polymerization of certain monoethylenically unsaturated hydrophylic and hydrophobic monomers, i.e., hydrophilic $\alpha,\beta$-unsaturated carboxylic acids and hydrophobic $\alpha,\beta$-unsaturated carboxylic esters. The addition polymer should possess certain specific properties. It should have a minimum film forming temperature (MFT) of less than about 80° C. and an intrinsic viscosity in tetrahydrofuran at 30° C. of about 0.05 to 0.2 dl/g. The addition polymer must comprise a critical proportion of the $\alpha,\beta$-unsaturated carboxylic acid. Thus specifically the addition polymer comprises from about 12 to 25% by weight of at least one hydrophylic monomer selected from acrylic acid and methacrylic acid interpolymerized with about 88 to 75% by weight of at least one hydrophobic monomer selected from alkyl acrylate and alkyl methacrylate in which alkyl has from 1 to 8 carbon atoms and can be straight or branched. The polymerization procedures, including both emulsion and solution polymerization, whereby the addition polymer employed in the invention can be prepared are described in U.S. Pat. No. 4,017,662. The addition polymers employed in the composition of the invention, should be present in a concentration of about 4 to 13% by weight of the composition, preferably about at least 10% by weight.

The composition of the invention contains as essential ingredients, in addition to the primary coating agent described hereinabove, a fugitive plasticizer, a permanent plasticizer, a chelating agent, a leveling agent, an antifoaming agent, a preservative, a bicarbonate, ammonia and water. These essential ingredients are defined more fully hereinbelow.

The composition of the invention contains a fugitive plasticizer and coalescing agent to facilitate good film formation. Fugitive plasticizers which can be employed are diglyme, the monoalkyl ethers of diethylene glycol and dipropylene glycol, where alkyl can be straight or branched and has from 1 to 5 carbon atoms, 2-butoxyethanol and 3-methoxybutanol-3 and mixtures thereof. The fugitive plasticizer should be present in the composition of the invention in a concentration of about 1 to 3% by weight of the composition.

The composition of the invention contains as permanent plasticizer and coalescing agent from about 0.7 to 1.5% by weight of tributoxyethyl phosphate.

The composition of the invention contains from about 0.05 to 1.5% by weight of tetrasodium ethylenediaminetetraacetate as chelating agent. The chelating agent prevents or substantially retards discoloration of the instant composition and of the film deposited therefrom which may occur if small amounts of certain metal ions, e.g. ferrous ions, inadvertently are introduced into the composition, e.g., during manufacture thereof or subsequently by the consumer.

The composition of the invention contains as leveling agent from 0.005 to 0.02% by weight of a nonionic or anionic fluorocarbon surfactant. Such surfactants are well known in the polish formulation art. Suitable leveling agents are, for example, the fluorocarbon surfactants having the general formula $(C_aX'_{2a+1})fZ$, wherein a is a number from 6 to 12, X' is selected from fluorine and hydrogen, at least 55% by weight of $C_aX'_{2a+1}$ being fluorine, f is a number from 1 to 8, and Z is a water solubilizing radical such that $(C_aX'_{2a+1})fZ$ has some degree of water solubility. Suitable radicals represented by Z are those containing acid groups including sulfonic acid groups and their salts, substituted sulfuric acid groups and their salts and substituted phosphoric acid groups and their salts in which the substituents are preferably alkyl radicals of 1–5 carbon atoms and the like, the salts in all said salt groups preferably being either alkali metal, ammonium, alkaline earth metal or amine salts; amine salt groups; polyhydroxy groups such as glycols, polyols and the like; polyoxyalkylene groups; substituted short chain amino acid groups and their salts as defined above; carboxy acid groups and their salts as defined above; hydroxy groups; and amide groups and substituted amide groups in which the substituent is preferably alkyl of 1–5 carbon atoms. Thus for example, compounds that can be employed have one of the following structural formulas:

A. 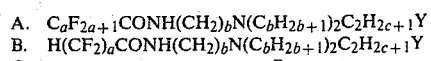
B. 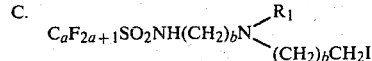
C.
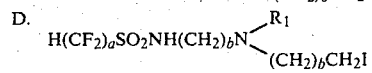
D.

-continued

E. 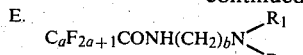
$$C_aF_{2a+1}CONH(CH_2)_bN\begin{matrix}R_1\\R_2\end{matrix}$$

F. 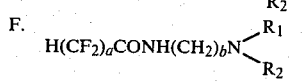
$$H(CF_2)_aCONH(CH_2)_bN\begin{matrix}R_1\\R_2\end{matrix}$$

G. $(C_aF_{2a+1}SO_3)_dX$
H. $[H(CF_2)_aSO_3]_dX$
I. $(C_aF_{2a+1}COO)_dX$
J. $[H(CF_2)_aCOO]_dX$
K. 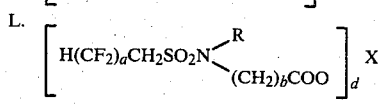
$$\left[C_aF_{2a+1}SO_2N\begin{matrix}R\\(CH_2)_bCOO\end{matrix}\right]_dX$$

L.
$$\left[H(CF_2)_aCH_2SO_2N\begin{matrix}R\\(CH_2)_bCOO\end{matrix}\right]_dX$$

M. $(FO)_e\underset{\underset{O}{\|}}{P}(ONH_4)_f$

N. $H(CF_2)_hQ$
O. $F(CF_2)_hQ$ wherein a is a whole number of 6–12, b is a whole number not greater than 5, c is a whole number not greater than 15, d is a whole number not greater than 2 and having the same value as the valence of X, e and f are whole numbers totaling 3, X is a member of the class consisting of hydrogen, alkali metals, alkaline earth metals, amine groups, and ammonium, Y is a halogen, R is an alkyl group of not more than 5 carbon atoms, $R_1$ is a member of the class consisting of alkyl groups of not more than 5 carbon atoms and hydrogen, $R_2$ is a member of the class consisting of hydrogen, alkyl groups of not more than 5 carbon atoms, aryl groups, alkyl groups attached to a water-solubilizing salt-forming anion, heterocyclic aryl groups in which the nitrogen atom of said $$-N\begin{matrix}R_1\\R_2\end{matrix}$$

portion of formulas E and F set out above is an element in the ring, h is a whole number of 6–12, Q is a member of the class consisting of TOH in which T is a divalent hydrocarbon radical and TOH is a monovalent radical of a nontertiary alcohol which contains a non-aromatic carbon atom bearing the alcoholic hydroxyl group and in which all of the non-aromatic carbon atoms are saturated, and carboxylic acid oxidation products of TOH and alkali metal, alkaline earth metal, amine and ammonium salts of said acids, and FO is a perfluorinated alcohol group containing 6 to 13 carbon atoms. The following are specific examples of suitable fluorocarbon leveling agents:

1. $C_7H_{15}CONHC_3H_6N(CH_3)_3I$
2. $C_7H_{15}CONHC_3H_6N(CH_3)_2$
3. $C_7H_{15}CONHC_3H_6N(CH_3)_2C_{10}H_{21}Br$
4. $C_7H_{15}CONHC_3H_6N(CH_3)_2C_2H_5I$
5. A mixture of the ammonium salts of mono- and di-(1,1,7-trihydroperfluoroheptyl)phosphate
6. A mixture of the ammonium salts of mono- and di-(1,1,11-trihydroperfluoroundecyl)phosphate
7. A mixture of the ammonium salts of mono- and di-(1,1,9-trihydroperfluorononyl)phosphate
8. A mixture of compositions having the general formula $H(CF_2)_nCH_2OH$ where n equals a whole number of 6–12
9. $C_7F_{15}COOH$
10. $C_7H_{15}COONH_4$
11. 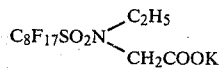
$$C_8F_{17}SO_2N\begin{matrix}C_2H_5\\CH_2COOK\end{matrix}$$

12. 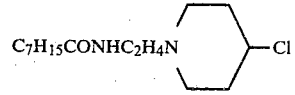
$$C_7H_{15}CONHC_2H_4N\diagup\kern-1em\diagdown\text{—Cl}$$

13. $C_7H_{15}CONHC_2H_4N(CH_3)_3SO_4CH_3$
14. $C_9H_{19}CONHC_2H_4N(CH_3)_3I$
15. $C_8H_{17}SO_3K$
16. $H(CF_2CF_2)_5COONH_4$
17. Ammonium dodecafluoroheptyl phosphate
18. 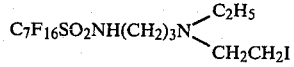
$$C_7F_{16}SO_2NH(CH_2)_3N\begin{matrix}C_2H_5\\CH_2CH_2I\end{matrix}$$

The above-defined fluorocarbon leveling compounds are described in U.S. Pat. No. 2,937,098.

Other fluorocarbon leveling compounds that can be employed in the instant invention are perfluorinated alkyl-substituted cyclohexane acids and salts thereof and perfluorinated cyclohexylalkane acids and salts thereof. Preferably, the acids and salts of the aforesaid leveling agents include the sulfonic acids, carboxylic acids and phosphonic acids and the alkali metal, ammonium and alkaline earth metal salts of the above acids. These leveling compounds are described in U.S. Pat. Nos. 2,593,737, 2,732,398 and 3,163,547. Preferred fluorocarbon leveling agents are those having the formulas K and L above, particularly where d is the number 1, for example potassium N-ethyl-N-[(heptadecafluorooctyl)sulfonyl]glycinate (compound 11 above) available from 3M Company under the product number FC-128.

The composition of the invention contains from about 0.0001 to 0.003% by weight of an antifoaming agent. The antifoaming agent employed is a dimethylpolysiloxane compound adapted to control foaming in aqueous systems. The use of dimethylpolysiloxane antifoaming agents in floor polishing compositions is well known in the art. Typical dimethylpolysiloxane antifoaming compounds which can be employed in the instant composition are HODAG FD-82, available from Hodag Chemical Corporation, Skokie, Ill., which is a 30% oil-in-water emulsion of a dimethylpolysiloxane antifoaming agent (viscosity 400–500 cps at 25° C.) containing a nonionic emulsifier and having a specific gravity at 25° C. of 0.970 and a viscosity of 4000 cps at 25° C.; and SWS antifoam compounds available from SWS Silicones Corporation, Adrian, Mich., such as SWS-211, SWS-213 and SWS-214, which are aqueous emulsions containing respectively 10%, 30% and 10% of a dimethylpolysiloxane antifoaming agent having a density of 8.3 lbs./gal. and having viscosities (Brookfield RVF, Spindles 1–7) of 5000, 15,000 and 1000 respectively.

The composition of the invention contains as a preservative from about 0.002 to 0.02% by weight of 1,2- benzoisothiazoline-3-one. The 1,2-benzoisothiazolin-3-one is employed in the form of a water-soluble salt with metals such as sodium or potassium, or with ammonia, or amines such as diethanolamine, triethanolamine, morpholine, etc., and mixtures of said salts. The 1,2-benzoisothiazoline-3-one provides for prolonged protection of the composition of the invention against infection with and hence against deterioration by microorganisms and thus provides for good storage stability, i.e., good shelf life. 1,2-Benzoisothiazoline-3-one and salts thereof are described in U.S. Pat. No. 3,065,123 and are commercially available from ICI AMERICA INC., Wilmington, Del., under the tradename PROXEL, for example PROXEL HL which is an aqueous alkaline solution containing approximately 31–35% of 1,2-benzothiazoline-3-one, 12% of diethanolamine, 13% of triethanolamine and 8% morpholine.

The composition of the invention contains from about 0.05 to 0.3% by weight of an alkali-metal bicarbonate selected from sodium bicarbonate and potassium bicarbonate. The alkali-metal bicarbonate aids in the solubilization of the coating film deposited from the composition of the invention.

The composition of the invention contains from about 75 to 94% by weight of water.

The instant composition has a solids content of from about 5 to 15% by weight. The term "solids" as used herein refers to the non-volatiles of the instant composition, i.e., those ingredients which in combination comprise the protective coating film deposited from the instant composition. The ingredients which comprise the non-volatiles of the instant composition are those designated hereinbefore as components (a), (c) to (h), (j) and (k). A solids content of less than about 5% by weight is to be avoided since such low concentrations would result in inadequate film thickness and hence would affect adversely both gloss and floor protection. Solids in excess of about 15% by weight also should be avoided since this would result in excessive film thickness and therefore would adversely affect the self-stripping properties of the instant composition. Preferably the instant composition has a solids content of from about 10 to 15% by weight.

The composition of the invention contains sufficient ammonia to provide a pH of about 9 to 9.7. A pH in this range will provide a concentration of ammonia adequate to readily dissolve or disperse a coating previously deposited from the instant composition. The ammonia conveniently can be added as ammonium hydroxide.

The composition of the invention can also include certain optional ingredients defined hereinbelow.

The composition of the invention optionally can include up to 0.3% by weight of formaldehyde to ensure "quick kill" of any microorganisms with which the instant composition may become contaminated, particularly during manufacture and packaging. The formaldehyde, if employed, can be conveniently added as a 37% solution in water (formalin).

The composition of the invention optionally can include up to 0.2% by weight of caprolactam as a semifugitive plasticizer to aid in film formation.

The composition of the invention optionally can include, as film modifying agent, an alkali-soluble low molecular weight copolymer of styrene and maleic anhydride in order to enhance leveling and the hardness of the deposited film. The styrene-maleic anhydride copolymer includes unesterified and partially esterified copolymer. Those employed in the instant composition should have a styrene-maleic anhydride ratio of 1:1 to 3:1, a number average molecular weight of from about 1600 to about 1900 and an acid number of from about 220 to about 480. Such copolymers melt within the range of from about 115° to 170° C. and have a viscosity in aqueous ammonia solution (15% non-volatile material) of about 22 to 52 cps. The styrene-maleic anhydride copolymers employed in the instant composition are well known and are commercially available from ARCO Chemical Company under the tradename "SMA" resins. The following are examples of commercially available SMA resins (average number molecular weight/melting range/acid number/viscosity in aqueous ammonia-15% non-volatiles in parenthesis):

SMA 1000 (1600/150°–170° C./480/22 cps)
SMA 2000 (1700/140°–160° C./350/26 cps)
SMA 3000 (1900/115°–130° C./275/52 cps)
SMA 17352 (1700/160°–170° C./270/24 cps)
SMA 2625 (1900/135°–150° C./220/25 cps)

The styrene-maleic anhydride copolymer can be employed in a concentration up to about 5% by weight of the instant composition.

The instant composition can also include a fragrance in order to mask the odors of certain ingredients such as the plasticizer, ammonia, etc.

The instant composition can be applied to flooring using well known techniques, e.g. by mopping with a suitable mop such as a sponge mop. Conveniently the instant composition is applied with a damp sponge mop with occasional water rinsing of the mop. The composition should be applied to flooring as an even thin layer and allowed to dry thoroughly.

The composition of the invention is an essentially clear liquid having good storage stability. It has good cleaning properties and the film deposited therefrom is clear and resistant to discoloration, has a high gloss, and exhibits good wearability, scuff resistance and water and water spotting resistance. Furthermore the film is readily dissolved and/or dispersed and replaced by a fresh film on subsequent application of the instant composition.

The present invention is illustrated by the following examples without, however, being limited thereto.

| Component | % by weight |
|---|---|
| 1. Water (soft) | 64.0572 |
| 2. Formalin (37%) | 0.2270 |
| 3. Proxel HL[a] | 0.0500 |
| 4. FD-82[b] | 0.0010 |
| 5. Addition Polymer Emulsion (approx. 37%)[c] | 27.2800 |
| 6. Sodium Bicarbonate | 0.2850 |
| 7. Tributoxyethyl Phosphate | 1.1739 |
| 8. Caprolactam | 0.1290 |
| 9. Methyl Carbitol | 2.2500 |
| 10. Fragrance | 0.4999 |
| 11. Tetrasodium Ethylenediaminetetraacetate Solution (38%)[d] | 0.2650 |
| 12. SMA 17352 resin solution (20%)[e] | 1.9850 |
| 13. FC-128[f] | 0.0140 |

-continued

| Component | % by weight |
|---|---|
| 14. Ammonium Hydroxide (28%) | 1.7830 | pH = 9.1
Solids = approx. 12% by weight

[a] Liquid preservative from ICI America Inc.; aqueous solution of 1,2-benzothiazoline-3-one (31-35%), diethanolamine (12%), triethanolamine (13%) and morpholine (8%).
[b] Antifoaming agent from HODAG; 30% active oil in water emulsion of a dimethylpolysiloxane containing a nonionic emulsifier and having a viscosity of 4000 cps at 25° C.
[c] Prepared by emulsion polymerization; the addition polymer has a monomer composition of 15% ethyl acrylate, 15% butyl acrylate, 58% methyl methacrylate and 12% acrylic acid and an intrinsic viscosity in tetrahydrofuran (30° C.) of 0.15, and is identified in Table 1, column 11 of U.S. Pat. No. 4,017,662.
[d] HAMP-ENE 100 from W.R. Grace Co.
[e] SMA 17352 resin from ARCO Chemical Company; a 20% active solution in soft water containing 3.5% of ammonium hydroxide solution (28%).
[f] Fluorocarbon surfactant from 3M Company; potassium N-ethyl-N-[(heptadecafluorooctyl)sulfonyl]glycinate.

The composition of Example I is prepared as follows:

(a) A submix of components 7 to 10 is prepared by adding the tributoxyethyl phosphate to the methyl carbitol with agitation, then adding the caprolactam and continuing agitation until the caprolactam is dissolved, and finally adding the fragrance.

(b) A submix of component 12 and 13 is prepared by adding the FC-128 to the SMA resin solution (hot) with agitation and continuing agitation until the submix is clear.

(c) A stainless steel mixing kettle is charged with the soft water. To the cold soft water there is added consecutively with good agitation components 2 to 5. The sodium bicarbonate then is added slowly followed by very slow addition of the submix of components 7 to 10. Ammonium hydroxide is then added to pH 8.0 followed by the tetrasodium ethylenediaminetetraacetate solution. The submix of components 12 and 13 is then added followed by the remaining ammonium hydroxide solution. The batch is agitated for an additional thirty minutes and then is filtered through a 30 micron filter.

| Component | % by weight |
|---|---|
| 1. Water (soft) | 66.0422 |
| 2. Formalin (37%) | 0.2270 |
| 3. Proxel HL[a] | 0.0500 |
| 4. FD-82[b] | 0.0010 |
| 5. Addition Polymer Emulsion (approx. 37%)[c] | 27.2800 |
| 6. Sodium Bicarbonate | 0.2850 |
| 7. Tributoxyethyl Phosphate | 1.1739 |
| 8. Caprolactam | 0.1290 |
| 9. Methyl Carbitol | 2.2500 |
| 10. Fragrance | 0.4999 |
| 11. Tetrasodium Ethylenediaminetetraacetate Solution (38%)[d] | 0.2650 |
| 12. FC-128[e] | 0.0140 |
| 13. Ammonium Hydroxide (28%) | 1.7830 | pH = 9.1
Solids = approx. 12% by weight

[a] Liquid preservative from ICI America Inc.; aqueous solution of 1,2-benzothiazoline-3-one (31-35%), diethanolamine (12%), triethanolamine (13%) and morpholine (8%).
[b] Antifoaming agent from HODAG; 30% active oil in water emulsion of a dimethylpolysiloxane containing a nonionic emulsifier and having a viscosity of 4000 cps at 25° C.
[c] Prepared by emulsion polymerization; the addition polymer has a monomer composition of 15% ethyl acrylate, 15% butyl acrylate, 58% methyl methacrylate and 12% acrylic acid and an intrinsic viscosity in tetrahydrofuran (30° C.) of 0.15, and is identified in Table 1, column 11 of U.S. Pat. No. 4,017,662.
[d] HAMP-ENE 100 from W.R. Grace Co.
[e] Fluorocarbon surfactant from 3M Company; potassium N-ethyl-N-[(heptadecafluorooctyl)sulfonyl]glycinate.

The composition of Example II is prepared by a procedure similar to that described for the preparation of the composition of Example I except that the FC-128 is added as a 1% solution in water.

We claim:

1. A stable aqueous self-stripping, cleaning, coating and polishing composition consisting essentially of:
   (a) from about 4 to 13% by weight of a water-insoluble, alkali-soluble addition polymer comprising from about 12 to 25% by weight of the addition polymer of at least one hydrophilic monomer selected from the group consisting of acrylic acid and methacrylic acid interpolymerized with from about 88 to 75% by weight of the addition polymer of at least one hydrophobic monomer selected from the group consisting of alkyl acrylate and alkyl methacrylate, where alkyl has from 1 to 8 carbon atoms, said addition polymer having an intrinsic viscosity at 30° C. in tetrahydrofuran of between about 0.05 and 0.2 dl/g.;
   (b) from about 1 to 3% by weight of a fugitive plasticizer selected from the group consisting of diglyme, the mono-alkyl ether of diethylene glycol, the mono-alkyl ether of dipropylene glycol, 2-butoxyethanol and 3-methoxybutanol-(1), where alkyl has from 1 to 5 carbon atoms;
   (c) from about 0.7 to 1.5% by weight of tributoxyethyl phosphate;
   (d) from about 0.05 to 1.5% by weight of tetrasodium ethylenediaminetetraacetate;
   (e) from about 0.005 to 0.02% by weight of an anionic or nonionic fluorocarbon surfactant;
   (f) from about 0.0001 to 0.003% by weight of a dimethylpolysiloxane antifoaming agent;
   (g) from about 0.002 to 0.02% by weight of 1,2-benzoisothiazolin-3-one, said 1,2-benzothiazolin-3-one being in the form of a water-soluble salt;
   (h) from about 0.05 to 0.3% by weight of an alkali-metal bicarbonate selected from the group consisting of sodium bicarbonate and potassium bicarbonate;
   (i) from 0% to about 0.3% by weight of formaldehyde;
   (j) from 0% to about 0.2% by weight of caprolactam;
   (k) from 0% to about 5% of an alkali-soluble copolymer of styrene and maleic anhydride, said copolymer having a styrene-maleic anhydride ratio of from 1:1 to 3:1, a number average molecular weight of from 1600 to 1900 and an acid number of 220 to 480;
   (l) from about 75 to 94% by weight of water; and
   (m) ammonia to provide a pH of 9 to 9.7;
said composition having a solids content of from about 5 to 15% by weight.

2. A composition according to claim 1 wherein the addition polymer comprises methacrylic acid interpolymerized with at least one hydrophobic monomer selected from the group consisting of methyl methacrylate, ethyl acrylate and butyl acrylate.

3. A composition according to claim 2 wherein the fugitive plasticizer is the mono-alkyl ether of diethylene glycol.

4. A composition according to claim 3 having a solids content of from about 10 to 15% by weight.

5. A composition according to claim 4 wherein the addition polymer comprises methacrylic acid interpolymerized with methyl methacrylate, ethyl acrylate and butyl acrylate.

6. A composition according to claim 5 wherein the addition polymer has an intrinsic viscosity of between 0.1 and 0.2.

7. A composition according to claim 6 consisting essentially of:
   (a) from 10.0 to 10.5% by weight of addition polymer;
   (b) from 2.0 to 2.5% by weight of methyl carbitol;
   (c) from 1.0 to 1.2% by weight of tributoxyethyl phosphate;
   (d) from 0.08 to 0.12% of tetrasodium ethylenediaminetetraacetate;
   (e) from 0.01 to 0.02% by weight of potassium N-ethyl-N-[(heptafluorooctyl)sulfonyl]glycinate;
   (f) from 0.00025 to 0.00035% by weight of a dimethylpolysiloxane antifoaming agent;
   (g) from 0.01 to 0.02% by weight of 1,2-benzothiazolin-3-one;
   (h) from 0.25 to 0.30% by weight of sodium bicarbonate;
   (i) from 0.05 to 0.10% by weight of formaldehyde;
   (j) from 0.10 to 0.14% by weight of caprolactam;
   (k) from 0.35 to 0.45% by weight of a copolymer of styrene and maleic anhydride;
   (l) from 84 to 86% by weight of water; and
   (m) ammonia to provide a pH of 9 to 9.7;
said composition having a solids content of from 11.8 to 12.8% by weight.

8. A composition according to claim 7 wherein the addition polymer has a monomer composition of 15% ethyl acrylate, 15% butyl acrylate, 58% methyl methacrylate and 12% acrylic acid and an intrinsic viscosity of about 0.15; the copolymer of styrene and maleic anhydride has an average number molecular weight of 1700, a melting range of 160° to 170° C., an acid number of 270 and a viscosity in aqueous ammonia solution (15% non-volatiles) of 24 cps; and the pH is 9 to 9.2.

9. A composition according to claim 6 consisting essentially of:
   (a) from 10.0 to 10.5% by weight of addition polymer;
   (b) from 2.0 to 2.5% by weight of methyl carbitol;
   (c) from 1.0 to 1.2% by weight of tributoxyethyl phosphate;
   (d) from 0.08 to 0.12% of tetrasodium ethylenediaminetetraacetate;
   (e) from 0.01 to 0.02% by weight of potassium N-ethyl-N-[(heptafluorooctyl)sulfonyl]glycinate;
   (f) from 0.00025 to 0.00035% by weight of a dimethylpolysiloxane antifoaming agent;
   (g) from 0.01 to 0.02% by weight of 1,2-benzothiazolin-3-one;
   (h) from 0.25 to 0.30% by weight of sodium bicarbonate;
   (i) from 0.05 to 0.10% by weight of formaldehyde;
   (j) from 0.10 to 0.14% by weight of caprolactam;
   (k) 0% of a copolymer of styrene and maleic anhydride;
   (l) from 84 to 86% by weight of water; and
   (m) ammonia to provide a pH of 9 to 9.7;
said composition having a solids content of from 11.8 to 12.8% by weight.

10. A composition according to claim 9 wherein the addition polymer has a monomer composition of 15% ethyl acrylate, 15% butyl acrylate, 58% methyl methacrylate and 12% acrylic acid and an intrinsic viscosity of about 0.15; and the pH is 9 to 9.2.

11. A method of periodically cleaning a floor and polishing the floor with a thin layer of a clear high gloss coating without substantial buildup of the coating which comprises periodically mopping the floor with the composition according to claim 1 and allowing the composition to dry on the floor.

12. A method according to claim 11 wherein, in the composition, the addition polymer comprises methacrylic acid interpolymerized with at least one hydrophobic monomer selected from the group consisting of methyl methacrylate, ethyl acrylate and butyl acrylate; the fugitive plasticizer is the mono-alkyl ether of diethylene glycol; and the solids content is from about 10 to 15% by weight.

13. A method according to claim 12 wherein, in the composition, the addition polymer comprises methacrylic acid interpolymerized with methyl methacrylate, ethyl acrylate and butyl acrylate and has an intrinsic viscosity of between 0.1 and 0.2.

14. A method according to claim 13 wherein the composition consists essentially of:
   (a) from 10.0 to 10.5% by weight of addition polymer;
   (b) from 2.0 to 2.5% by weight of methyl carbitol;
   (c) from 1.0 to 1.2% by weight of tributoxyethyl phosphate;
   (d) from 0.08 to 0.12% of tetrasodium ethylenediaminetetraacetate;
   (e) from 0.01 to 0.02% by weight of potassium N-ethyl-N-[(heptafluorooctyl)sulfonyl]glycinate;
   (f) from 0.00025 to 0.00035% by weight of a dimethylpolysiloxane antifoaming agent;
   (g) from 0.01 to 0.02% by weight of 1,2-benzothiazolin-3-one;
   (h) from 0.25 to 0.30% by weight of sodium bicarbonate;
   (i) from 0.05 to 0.10% by weight of formaldehyde;
   (j) from 0.10 to 0.14% by weight of caprolactam;
   (k) from 0.35 to 0.45% by weight of a copolymer of styrene and maleic anhydride;
   (l) from 84 to 86% by weight of water; and
   (m) ammonia to provide a pH of 9 to 9.7;
said composition having a solids content of from 11.8 to 12.8% by weight.

15. A method according to claim 14 wherein, in the composition, the addition polymer has a monomer composition of 15% ethyl acrylate, 15% butyl acrylate, 58% methyl methacrylate and 12% acrylic acid and an intrinsic viscosity of about 0.15; the copolymer of styrene and maleic anhydride has an average number molecular weight of 1700, a melting range of 160° to 170° C., an acid number of 270 and a viscosity in aqueous ammonia solution (15% non-volatiles) of 24 cps; and the pH is 9 to 9.2.

16. A method according to claim 13 wherein the composition consists essentially of:
   (a) from 10.0 to 10.5% by weight of addition polymer;
   (b) from 2.0 to 2.5% by weight of methyl carbitol;
   (c) from 1.0 to 1.2% by weight of tributoxyethyl phosphate;
   (d) from 0.08 to 0.12% of tetrasodium ethylenediaminetetraacetate;
   (e) from 0.01 to 0.02% by weight of potassium N-ethyl-N-[(heptafluorooctyl)sulfonyl]glycinate;
   (f) from 0.00025 to 0.00035% by weight of a dimethylpolysiloxane antifoaming agent;

(g) from 0.01 to 0.02% by weight of 1,2-benzothiazolin-3-one;
(h) from 0.25 to 0.30% by weight of sodium bicarbonate;
(i) from 0.05 to 0.10% by weight of formaldehyde;
(j) from 0.10 to 0.14% by weight of caprolactam;
(k) 0% of a copolymer of styrene and maleic anhydride;
(l) from 84 to 86% by weight of water; and
(m) ammonia to provide a pH of 9 to 9.7;
said composition having a solids content of from 11.8 to 12.8% by weight.

17. A method according to claim 16 wherein, in the composition, the addition polymer has a monomer composition of 15% ethyl acrylate, 15% butyl acrylate, 58% methyl methacrylate and 12% acrylic acid and an intrinsic viscosity of about 0.15; and the pH is 9 to 9.2.

* * * * *

UNITED STATES PATENT AND TRADEMARK OFFICE
CERTIFICATE OF CORRECTION

PATENT NO. : 4,299,749
DATED : November 10, 1981
INVENTOR(S) : Francis L. McCarthy and Thomas H. Bach It is certified that error appears in the above-identified patent and that said Letters Patent are hereby corrected as shown below:

Column 1, line 30, "Emulision" should read -- Emulsion --.

Column 8, line 52, -- Example I -- should be inserted before the example.

Column 9, line 24, "component" should read -- components --.

Column 9, line 40, -- Example II -- should be inserted before the example.

Signed and Sealed this

Thirteenth Day of April 1982

[SEAL]

Attest:

GERALD J. MOSSINGHOFF

Attesting Officer     Commissioner of Patents and Trademarks